US012220777B2

(12) United States Patent
Sasaki et al.

(10) Patent No.: US 12,220,777 B2
(45) Date of Patent: Feb. 11, 2025

(54) SCREW TIGHTENING DEFECT DETERMINATION DEVICE AND LEARNING DEVICE

(71) Applicant: OMRON Corporation, Kyoto (JP)

(72) Inventors: Tatsuya Sasaki, Kyoto (JP); Takanori Shibutani, Kyoto (JP)

(73) Assignee: OMRON Corporation, Kyoto (JP)

( * ) Notice: Subject to any disclaimer, the term of this patent is extended or adjusted under 35 U.S.C. 154(b) by 110 days.

(21) Appl. No.: 17/919,284

(22) PCT Filed: Mar. 2, 2021

(86) PCT No.: PCT/JP2021/007993
§ 371 (c)(1),
(2) Date: Oct. 17, 2022

(87) PCT Pub. No.: WO2021/235041
PCT Pub. Date: Nov. 25, 2021

(65) Prior Publication Data
US 2023/0182241 A1 Jun. 15, 2023

(30) Foreign Application Priority Data
May 20, 2020 (JP) .................. 2020-088129

(51) Int. Cl.
*B23P 19/06* (2006.01)
*G05B 19/05* (2006.01)
(52) U.S. Cl.
CPC .............. *B23P 19/06* (2013.01); *G05B 19/05* (2013.01); *G05B 2219/23359* (2013.01)

(58) Field of Classification Search
CPC .................. B23P 19/06; G05B 19/05; G05B 2219/23359; B25B 23/147
See application file for complete search history.

(56) References Cited

U.S. PATENT DOCUMENTS 5,549,169 A    8/1996  Matsumura et al.

FOREIGN PATENT DOCUMENTS

| CN | 101767329    | 7/2010 |
| DE | 102016008993 | 2/2017 |
| DE | 102017219477 | 5/2019 |
| JP | S6150777     | 3/1986 |
| JP | S61182781    | 8/1986 |
| JP | S6420977     | 1/1989 |

(Continued)

OTHER PUBLICATIONS

"International Search Report (Form PCT/ISA/210) of PCT/JP2021/007993", mailed on Apr. 27, 2022, with English translation thereof, pp. 1-4.

(Continued)

*Primary Examiner* — Lee A Holly
(74) *Attorney, Agent, or Firm* — JCIPRNET

(57) ABSTRACT

Even when a tapping screw is used in a soft material, it is determined whether or not a screw tightening defect has occurred. A PLC (10) comprises a determination unit (13) which for a rotational torque data sequence having a predetermined number of data points, generates a normalized torque data sequence that is the amount of change with respect to rotational torque at a first data point of the data sequence, and determines whether screw tightening is defective, on the basis of the normalized torque data sequence.

7 Claims, 5 Drawing Sheets

(56) References Cited

FOREIGN PATENT DOCUMENTS

| JP | 2005095942 | 4/2005 | | |
|----|------------|--------|---|---|
| JP | 2012200807 | 10/2012 | | |
| JP | 2013061695 | 4/2013 | | |
| JP | 2016147317 | 8/2016 | | |
| WO | 2015045871 | 4/2015 | | |
| WO | WO-2015045871 A1 * | 4/2015 | ........... | B25B 23/147 |
| WO | 2016042597 | 3/2016 | | |
| WO | 2020008666 | 1/2020 | | |

OTHER PUBLICATIONS

"Written Opinion of the International Searching Authority (Form PCT/ISA/237) of PCT/JP2021/007993", mailed on Apr. 27, 2022, with English translation thereof, pp. 1-9.
"Office Action of China Counterpart Application", issued on Jul. 19, 2024, with English translation thereof, pp. 1-15.
"Partial Search Report of Europe Counterpart Application", issued on Aug. 28, 2024, p. 1-p. 12.
"Search Report of Europe Counterpart Application", issued on Dec. 9, 2024, p. 1-p. 12.

* cited by examiner

SCREW TIGHTENING DEFECT DETERMINATION DEVICE AND LEARNING DEVICE

CROSS-REFERENCE TO RELATED APPLICATION

This application is a 371 application of the International PCT application serial no. PCT/JP2021/007993, filed on Mar. 2, 2021, which claims the priority benefits of Japan Patent Application No. 2020-088129, filed on May 20, 2020. The entirety of each of the above-mentioned patent applications is hereby incorporated by reference herein and made a part of this specification.

TECHNICAL FIELD

The invention relates to a screw tightening defect determination device.

RELATED ART

Patent Literature 1 discloses a screw tightening state detection device of an electric rotary tool, including a cylindrical casing accommodating a spring elastically supporting a steel ball engaged with an internal gear of a deceleration mechanism in a clutch mechanism, provided with a torque adjustment mechanism having an externally operable adjustment screw performing elastic adjustment of the spring inside the cylindrical casing, and provided with a torque detection element on an outer surface of the cylindrical casing.

The screw tightening state detection device of the electric rotary tool recited in Patent Literature 1 is capable of determining whether the screw tightening state is favorable or defective by converting a detection value of the output signal detected by the torque detection element at the time of a screw tightening process, for example, into a torque value based on the detection value.

CITATION LIST

Patent Literature

[Patent Literature 1] Japanese Laid-open No. 2016-147317

SUMMARY OF INVENTION

Technical Problem

However, for example, in the case where a tapping screw is used with respect to a soft material (workpiece), such as resin, due to an incorrect screw length or defective formation of the workpiece, a phenomenon may occur that the tip of the tapping screw advances over the bottom part of the workpiece during temporary tightening, which is a process performed until the bearing surface of the tapping screw contacts the workpiece. In such case, the torque value required until final tightening, which is a process after the bearing surface of the tapping screw contacts the workpiece from the temporary screwing of the tapping screw, for example, is different. However, the torque value varies for each workpiece. Therefore, it is difficult to determine whether the tapping screw normally arrives at the bottom by simply performing determination on whether the screw tightening state is favorable or defective based solely on the torque value in the screw tightening state detection device of the electric rotary tool described in Patent Document 1.

An objective of an aspect of the invention is to realize a screw tightening defect determination device capable of determining whether a screw tightening defect occurs even in the case where a tapping screw is used in a soft material.

Solution to Problem

In order to solve the above issue, an aspect of the invention provides a screw tightening defect determination device, which, among data points sampling, at a predetermined cycle, a rotary torque of a motor that generates a rotary movement of a driver for tightening a screw and around an axis, generates a normalized torque data sequence that is an amount of change with respect to the rotary torque at an initial data point of a data sequence for the data sequence, the data sequence being a data sequence of the rotary torque formed by data points of a predetermined number and ending with a data point at which the rotary torque is equal to or greater than a predetermined first threshold, and determines whether a defect occurs in screw tightening based on the normalized torque data sequence.

Effects of Invention

According to the screw tightening defect determination device according to an aspect of the invention, whether a defect occurs in screw tightening can be determined even in the case where a tapping screw is used in a soft material.

DESCRIPTION OF EMBODIMENTS

In the following, an embodiment (referred to as "the embodiment" in the following) according to an aspect of the invention is described based on the drawings.

1. Application Example

Figure 1:
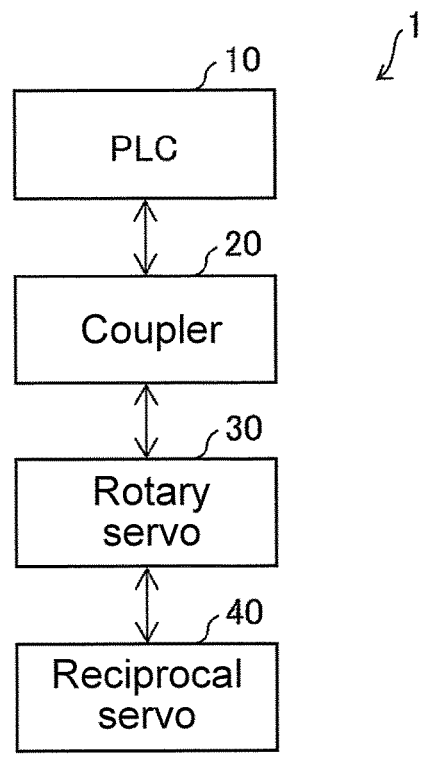
FIG. 1 is a block diagram schematically illustrating a screw tightening system according to an embodiment.

FIG. 1 is a block diagram schematically illustrating a screw tightening system 1 according to an embodiment. As shown in FIG. 1, the screw tightening system 1 includes a programmable logic controller 10 (screw tightening defect determination device), a coupler 20, a rotary servo 30 (first motor), and a reciprocal servo 40 (second motor). The screw tightening system 1 performs a screw tightening operation through a rotary movement of a driver 51 (see FIG. 3), which will be described afterwards, around an axis and a reciprocal movement of the driver 51 toward an axial direction. At this time, the PLC 10 exerts control on the screw tightening operation and determines whether a defect occurs in the screw tightening operation.

In the specification, the defect in the screw tightening operation means bottoming. Bottoming means the screw reaches the bottom of the screw hole before screw tightening is completed because the screw is longer than the screw hole or the workpiece is not properly formed.

The rotary servo 30 is a motor that generates a rotary movement of the driver 51 around the axis. In addition, the rotary servo 30 outputs its own rotary velocity (deg./s), rotary amount (deg.), and rotary torque (proportion (%) with respect to a rated torque) to the coupler 20. Specifically, the rotary servo 30 outputs data points sampling its own rotary velocity, rotary amount, and rotary torque at a predetermined cycle to the coupler 20.

The reciprocal servo 40 is a motor generating a reciprocal movement in the axial direction of the driver 51. In addition, the rotary servo 40 outputs the movement velocity (mm/s), movement position (mm), and movement torque (proportion (%) with respect to a rated torque) of the driver 51 due to its own rotation to the coupler 20.

The coupler 20 is connected to the PLC 10, the rotary servo 30, and the reciprocal servo 40. Specifically, the coupler 20 transmits a control signal received from the PLC 10 to the rotary servo 30 and the reciprocal servo 40. In addition, the coupler 20 transmits the data points sampling the rotary velocity, the rotary amount, and the rotary torque of the rotary servo 30 at a predetermined cycle that are received from the rotary servo 30 to the PLC 10. In addition, the coupler 20 transmits the movement velocity, the movement position, and the movement torque of the driver 51 due to the rotation of the reciprocal servo 40 that are received from the reciprocal servo 40 to the PLC 10.

In the following description, the rotary velocity, the rotary amount, and the rotary torque of the rotary servo 30 and the movement velocity, the movement position, and the movement torque of the driver 51 due to the rotation of the reciprocal servo 40 arranged in the data sequence of the rotary torque are generally referred to as parameters.

Figure 2:
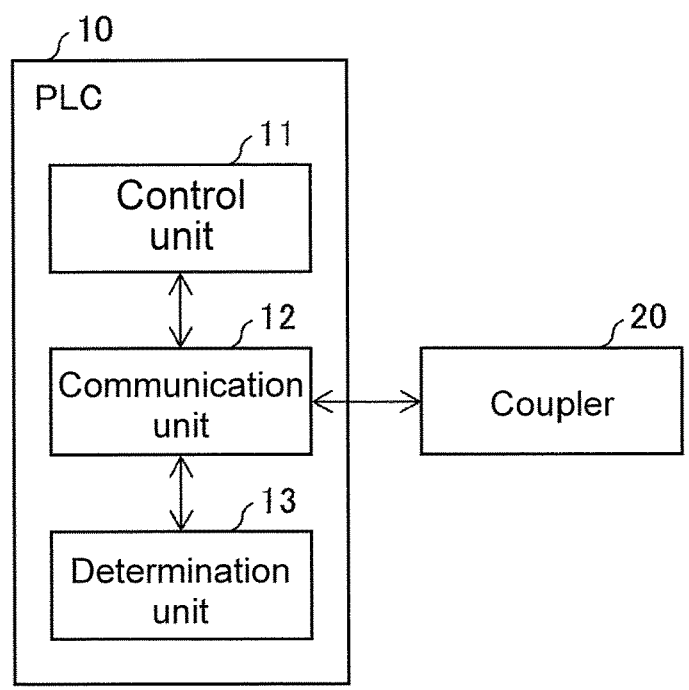
FIG. 2 is a block diagram illustrating a configuration of a PLC according to the embodiment.

FIG. 2 is a block diagram illustrating a configuration of the PLC 10. The PLC 10 controls the operation of the screw tightening system 1. As shown in FIG. 2, the PLC 10 includes a controller 11, a communication unit 12, and a determination unit 13.

The controller 11 outputs a control signal for controlling the rotary servo 30 and the reciprocal servo 40 to the communication unit 12. The communication unit 12 transmits the control signal input from the controller 11 to the coupler 20. The control signal is transmitted to the rotary servo 30 and the reciprocal servo 40 via the coupler 20, and controls the rotary servo 30 and the reciprocal servo 40. The controller 11 synchronizes and controls the rotary servo 30 and the reciprocal servo 40. In addition, the controller 11 feeds the parameters of the rotary servo 30 and the reciprocal servo 40 back to the control of the rotary servo 30 and the reciprocal servo 40.

The communication unit 12 receives the parameters from the rotary servo 30 and the reciprocal servo 40 via the coupler 20. The control unit 11 and the determination unit 13 acquire the parameters as necessary from the coupler 20 via the communication unit 12.

The determination unit 13 determines whether a screw tightening defect occurs. The content of the determination made by the determination unit 13 will be described in the following.

In addition, the screw tightening system 1 includes a notification device not shown herein. In the case of determining that a screw tightening defect occurs, the determination unit 13 outputs the determination result through the notification device. The notification device is a speaker which outputs a sound indicating the determination result or a display displaying an image indicating the determination result, for example.

2. Configuration Example (Configuration of Screw Tightening System 1)

Figure 3:
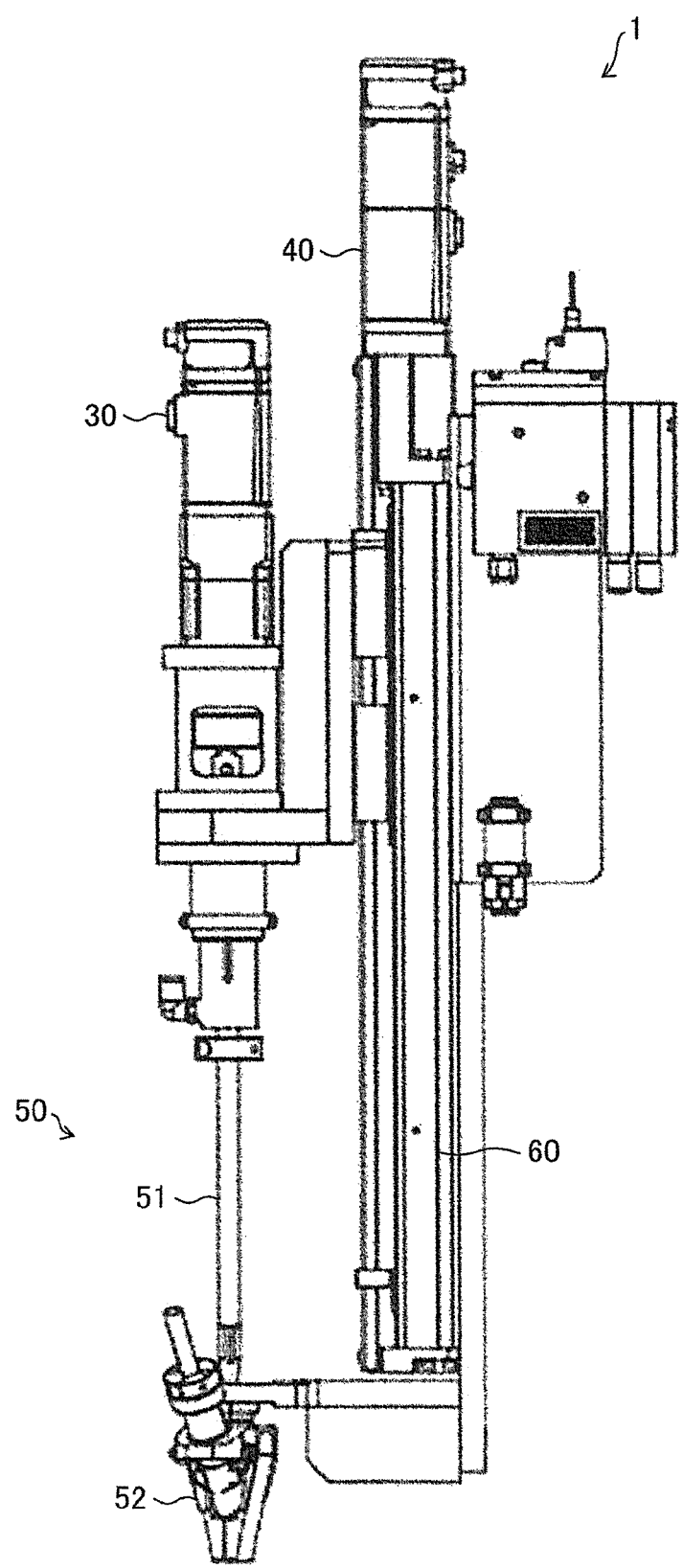
FIG. 3 is a view illustrating an example of the appearance of the screw tightening system according to the embodiment.

FIG. 3 is a view illustrating an example of the appearance of the screw tightening system 1 according to the embodiment. As shown in FIG. 3, the screw tightening system 1 includes the rotary servo 30, the reciprocal servo 40, a driver unit 50, and a strut 60. In addition, while not shown in FIG. 3, the screw tightening system 1 also includes the PLC 10 and the coupler 20 as described above.

The driver unit 50 is a unit for tightening a screw. The driver unit 50 includes the driver 51 and a screw holder 52. The driver 51 executes a screw tightening operation through the rotary movement around the axis as well as the reciprocal movement in the axial direction. In the following, in the axial direction of the driver 51, the movement direction of the driver 51 during the screw tightening process is referred to as "below/lower direction".

The rotary servo 30 is arranged above the driver 51 and generates the rotary movement of the driver 51 around the axis. In addition, the screw holder 52 holds a screw, which is provided below the driver 51 and is a target of screw tightening by the driver 51.

The strut 60 supports the driver unit 50 to be movable in the upper-lower direction. The reciprocal servo 40 is provided at the upper part of the strut 60, and is connected to the driver unit 50 via a ball screw (not shown). The rotary movement of the reciprocal servo 40 is converted into a linear movement in the upper-lower direction by the ball screw. As a result, the driver unit 50 moves reciprocally in the upper-lower direction.

(Screw Tightening Operation)

The tightening operation by the screw tightening system 1 is as follows. Firstly, the screw holder 52 in the state of holding the screw is the target on which screw tightening is performed, and the screw holder 52 lowers the screw to a place where screw tightening is performed on the workpiece (not shown) formed by resin. However, the workpiece is not limited to resin, as long as it is formed by a soft material. Then, the driver 51 presses against the screw while rotating the screw toward the place where screw tightening is performed until the screw is temporarily seated. Here, being temporarily seated refers to a state in which the bearing surface of the screw is in contact with the workpiece.

The screw tightening system 1 further performs final tightening by pressing while rotating the screw from the state in which the screw is temporarily seated. In the embodiment, the final tightening is performed until the rotary torque of the rotary servo 30 reaches a predetermined final tightening completion value. When the rotary torque reaches the final tightening completion value, the screw tightening system 1 stops pressing the screw and keeps the rotary torque in a state of being equal to or greater than the final tightening completion value for 100 ms.

Then, the screw tightening system 1 sets the rotary torque of the rotary servo 30 to be 0% or less and releases the screw. Moreover, the screw tightening system 1 completes the screw tightening operation by moving the driver 51 upward and restoring the driver 51 to the original position. However, the rotary torque and the holding time above merely serve as an example, and may differ in accordance with the type of the screw and the type of the tightening/tightened object.

(Screw Tightening Defect Determination Operation)

Specifically, the determination unit 13 acquires the data points of the rotary torque from the coupler 20 via the communication unit 12. Then, among the acquired data points, the determination unit 13 generates a normalized torque data sequence for a rotary torque data sequence formed by data points of a predetermined number and ending with a data point at which the rotary torque is equal to or greater than a predetermined first threshold. Here, the normalized torque data sequence refers to the amounts of change of the rotary torque in the respective data points with respect to the rotary torque at the initial data point of the rotary torque data sequence. In addition, the first threshold is a predetermined value for the rotary torque of the rotary servo 30 at the time when the temporary tightening of the screw tightening system 1 ends and the final tightening starts.

The determination unit 13 acquires a second threshold from a storage device not shown herein. Here, the second threshold refers to a predetermined threshold for determining that a screw tightening defect occurs and for the normalized torque value at the data point of a predetermined position among the normalized torque data sequence.

The determination unit 13 determines that a screw tightening defect occurs in the case where the normalized torque at the data point of the predetermined position, among the normalized torque data sequence, is equal to or greater than a predetermined second threshold. Accordingly, the determination unit 13 can determine that a screw tightening defect occurs by determining that the normalized torque at the data point of the predetermined position, among the normalized torque data sequence, is equal to or greater than the second threshold.

It is noted that the determination unit 13 may also acquire a third threshold from the storage device not shown herein. Here, the third threshold refers to a predetermined threshold for determining that a screw tightening defect occurs and for a total of normalized torques at the data points of a predetermined range among the normalized torque data sequence.

In this case, the determination unit 13 determines that a screw tightening defect occurs in the case where the total of the normalized torques at the data points of the predetermined range, among the normalized torque data sequence, is equal to or greater than the third threshold. Accordingly, the determination unit 13 can determine that a screw tightening defect occurs by determining that the total of the normalized torques at the data points of the predetermined range, among the normalized torque data sequence, is equal to or greater than the third threshold.

Figure 4:
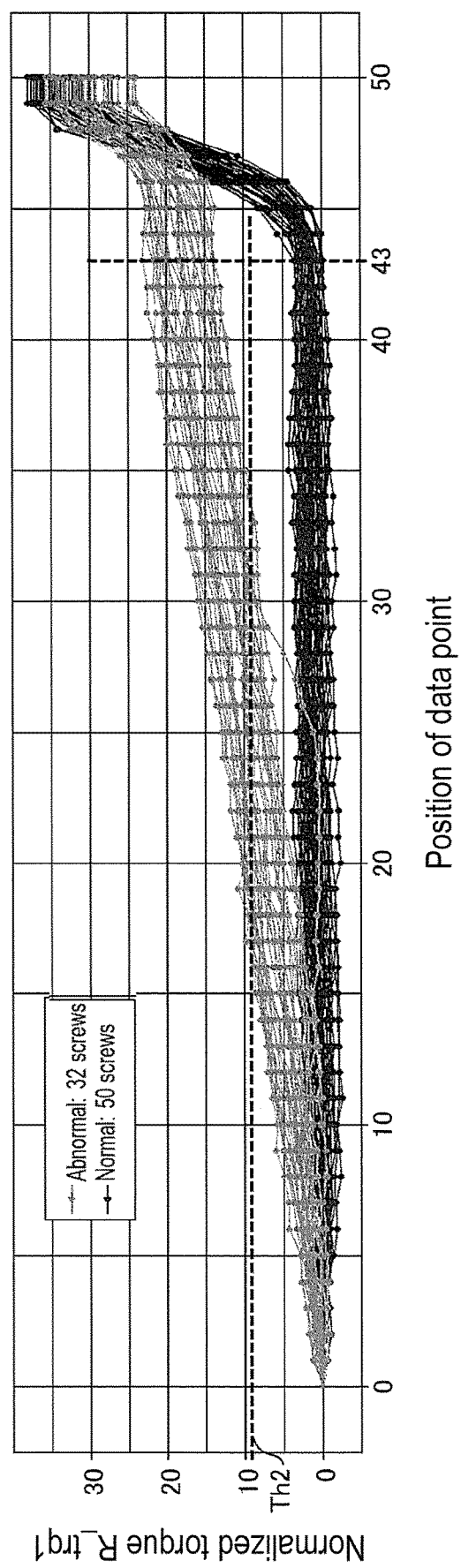
FIG. 4 is a diagram illustrating a normalized torque data sequence according to the embodiment.

FIG. 4 is a diagram illustrating a normalized torque data sequence according to the embodiment. The horizontal axis of FIG. 4 indicates the data point (sampling time), and the vertical axis thereof indicates the value of the normalized torque. Th2 in the vertical axis of FIG. 4 indicates the second threshold. In the example shown in FIG. 4, the number of data points included in the normalized torque data sequence is set as 51, and the predetermined position is set at the $43^{th}$ position from the beginning of the data sequence. Therefore, in the case where the normalized torque at the $43^{th}$ data point is equal to or greater than Th2, the determination unit 13 determines that a screw tightening defect occurs. In FIG. 4, the data of the 50 screws where screw tightening is normal is shown in black, and the data of the 32 screws where screw tightening is abnormal is shown in gray. In the data of the screws that are normal, neither of the normalized torques at the $43^{th}$ data points meets Th2. Meanwhile, in the data of the screws that are abnormal, since the torque increases because the screws advance over the bottom of the screw holes, the normalized torques at the $43^{th}$ data points are all equal to or greater than Th2. Therefore, according to the above determination, the defects in screw tightening can be properly determined. It is noted that, for non-normalized torques (raw data) before the beginning point is matched, since the torque variation of each workpiece is large, it is not possible to separate a normal one from an abnormal one by using a single threshold.

It suffices that the specific value of the second threshold is properly set to a value able to determine normal and defective screw tightening. In addition, it suffices that the number of the data points included in the normalized torque data sequence is set as appropriate without being limited to 51. In addition, it suffices that the predetermined position is properly set at a position able to determine normal and defective screw tightening by using the second threshold without being limited to the $43^{th}$ position. In addition, in the case where the determination unit 13 makes a determination by using the third threshold, the same applies to the specific value of the third threshold as well as the specific range of the data points for calculating the total of the normalized torques.

It is noted that, in the above example of the screw tightening operation, the screw tightening system 1 performs screw tightening with respect to the workpiece in a state of not having a female thread at the place where screw tightening is performed (tapping (self-tapping)). However, it is possible to perform screw tightening with respect to the workpiece in the state (tapped) in which the female screw is provided in advance at the place where screw tightening is performed.

3. Operation Example

Figure 5:
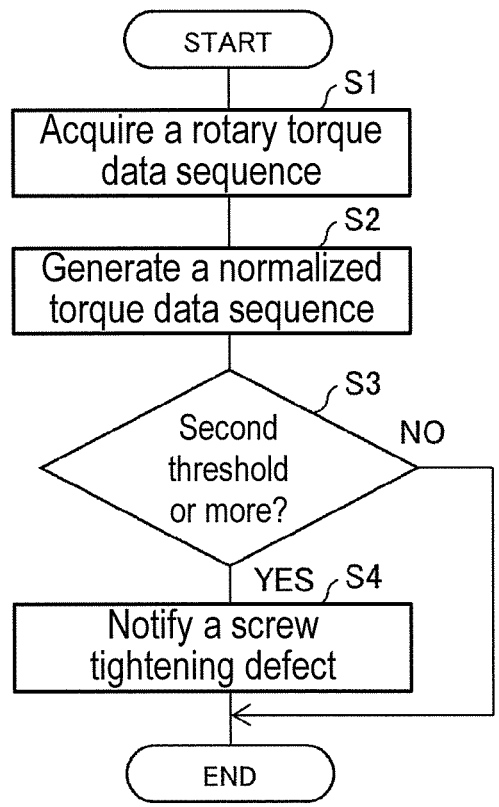
FIG. 5 is a flowchart illustrating an example of a screw tightening defect determination process according to the embodiment.

FIG. 5 is a flowchart illustrating an example of a screw tightening defect determination process according to the embodiment. The determination on the occurrence of a defect in the screw tightening operation by the determination unit 13 is described with reference to FIG. 5.

As shown in FIG. 5, the determination unit 13 acquires the rotary torque data sequence from the coupler 20 via the communication unit 12 (S1). Then, the determination unit 13 generates the normalized torque data sequence (S2). Then, the determination unit 13 acquires the second threshold from the storage device, and determines whether the normalized torque at the data point of the predetermined position, among the normalized torque data sequence, is equal to or greater than the second threshold (S3). In the case where the normalized torque is equal to or greater than the second threshold (YES in S3), the determination unit 13 outputs a notification signal indicating that the screw tightening is defective to the notification device (S4). In the case where the normalized torque is not equal to or greater than the second threshold (NO in S3), the determination unit 13 ends the process without executing Step S4.

It is noted that the determination unit 13 may also acquire the third threshold from the storage device in Step S3 and determines whether the total of the normalized torques at the data points of the predetermined range, among the normalized torque data sequence, is equal to or greater than the third threshold.

4. Modified Example

Although the configuration of the embodiment of the invention has been described in detail, the foregoing description is merely an illustrative example in all aspects. It goes without saying that various modifications and variations can be made without departing from the scope of the invention. For example, it is possible to make changes as follows. In the following, the same reference symbols are used for components same as the above embodiment, and the appropriate descriptions for points same as the above embodiment are omitted. It is possible to properly combine the modified examples as follows.

The screw tightening system according to the modified example includes a learning unit 70 (learning device) in addition to the configuration of the screw tightening system 1. The learning unit 70 is configured to be able to perform machine learning, and is, for example, a personal computer, a smart phone, a portable information terminal, or a server.

Figure 6:
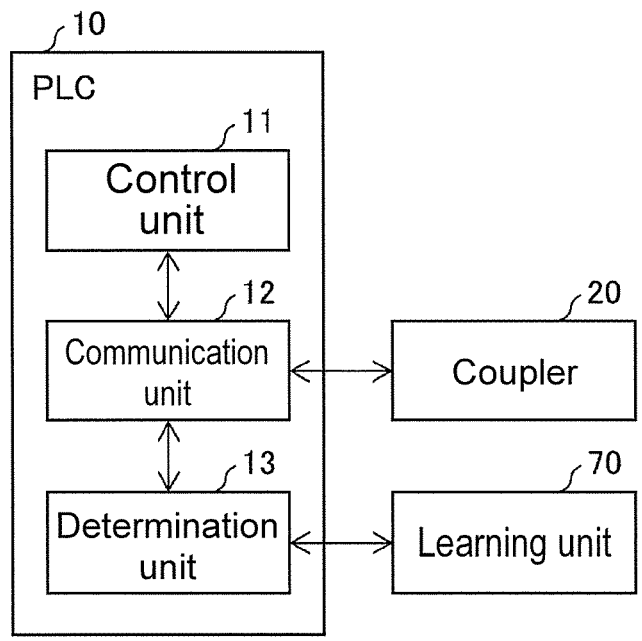
FIG. 6 is a block diagram illustrating a configuration of a PLC and a learning device according to a modified example of the embodiment.

FIG. 6 is a block diagram illustrating a configuration of the PLC 10 and the learning device according to a modified example of the embodiment. As shown in FIG. 6, in the modified example, the learning unit 70 is connected to the determination unit 13.

The learning unit 70 makes a decision through learning one or more of the predetermined number, the predetermined position, and the second threshold in the PLC 10 based on learning data including the normalized torque data sequence and the determination result of being normal or defective for the normalized torque data sequence. However, the learning unit 70 may also make a decision through learning one or more of the predetermined number, the predetermined range, and the third threshold in the PLC 10 based on learning data including the normalized torque data sequence and the determination result of being normal or defective for the normalized torque data sequence. The learning unit 70 of the embodiment makes a decision through learning all of the predetermined number, the predetermined position, and the second threshold in the PLC 10 based on learning data including the normalized torque data sequence and the determination result of being normal or defective for the normalized torque data sequence.

Here, learning means machine learning and supervised learning. As the algorithm of supervised learning, neural networks, isolation forests, or support vector machines are used, for example. In addition, the learning unit 70 may also calculate an abnormality score by using a probability density function and a kernelized stochastic model. The probability density function may be a normal distribution, for example. However, the invention is not limited thereto.

The learning unit 70 outputs the predetermined number, the predetermined position, or the second threshold that is determined to the determination unit 13 provided in the PLC 10. Accordingly, based on the predetermined number, the predetermined position, or the second threshold that is determined, the determination unit 13 can determine that a screw tightening defect occurs. However, the learning unit 70 may also output the predetermined number, the predetermined range, or the third threshold that is determined to the determination unit 13 provided in the PLC 10. The learning unit 70 of the embodiment outputs the predetermined number, the predetermined position, and the second threshold that are determined to the determination unit 13 provided in the PLC 10. Accordingly, based on the determined predetermined number, predetermined position, and second threshold that are learned by the learning unit 70, the determination unit 13 can determine that a screw tightening defect occurs. In the case where the learning unit 70 does not determine, through learning, one or more of the predetermined number, the predetermined position, and the second threshold, values that are not determined may also be stored in advance in the storage device.

In the case where there is a predetermined number of times of determination by the determination unit 13, a predetermined lapsed period, or an instruction from the outside, the learning unit 70 updates, through learning, one or more of the predetermined number, the predetermined position, and the second threshold based on the normalized torque data sequence in the screw tightening and the result of determination made by the determination unit. Accordingly, based on the predetermined number, the predetermined position, or the second threshold that is updated, the determination unit 13 can determine that a screw tightening defect occurs. However, in the case where there is a determination on the predetermined number of times of determination by the determination unit 13, a predetermined lapsed period, or an instruction from the outside, the learning unit 70 may also update, through learning, one or more of the predetermined number, the predetermined range, and the third threshold based on the normalized torque data sequence in the screw tightening and the result of determination made by the determination unit. In the case where a learning start condition is satisfied, the learning unit 70 in the embodiment updates, through learning, all of the predetermined number, the predetermined position, and the second threshold based on the normalized torque data sequence in screw tightening and the result of determination by the determination unit. Accordingly, based on the predetermined number, the predetermined position, and the second threshold that are updated, the determination unit 13 can determine that a screw tightening defect occurs.

Figure 7:
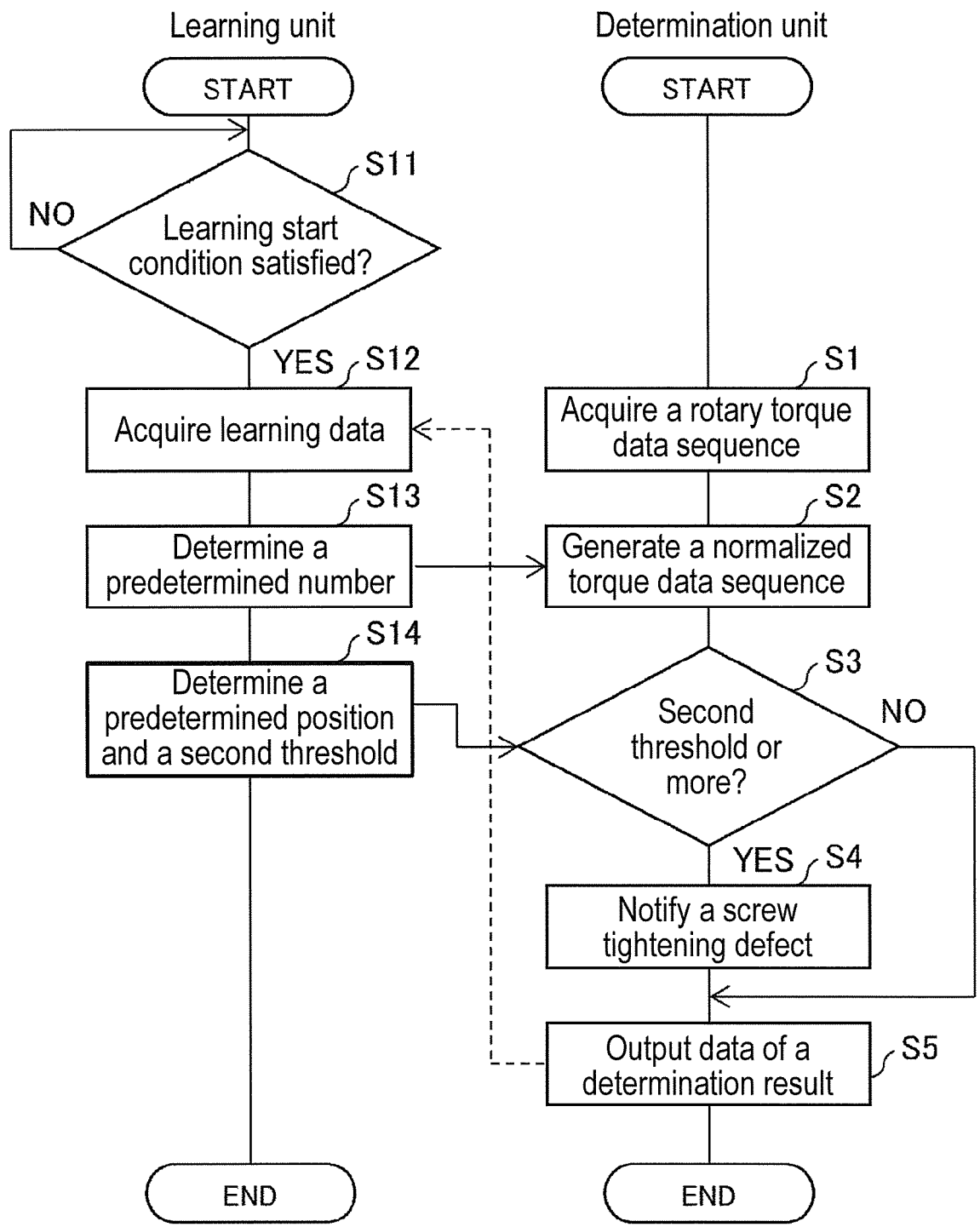
FIG. 7 is a flowchart illustrating an example of a screw tightening defect determination process according to a modified example of the embodiment.

FIG. 7 is a flowchart illustrating an example of a screw tightening defect determination process according to a modified example. The determination on the occurrence of a defect in the screw tightening operation by the determination unit 13 and the learning unit 70 is described with reference to FIG. 7. As shown in FIG. 7, the determination unit 13 performs the processes from S1 to S5. Since the processes performed by the determination unit 13 from S1 to S4 are the same as the above, the description thereof will be omitted. In the case where the normalized torque is not equal to or greater than the second threshold (NO in S3), or after a notification signal indicating that the screw tightening is defective is output to the notification device (S4), the determination unit 13 outputs the data of the determination result to the learning unit 70 (S5). Specifically, the determination unit 13 outputs the learning data including the normalized torque data sequence and the determination result of being normal or defective for the normalized torque data sequence to the learning unit 70. Then, the determination unit 13 ends the process of determining the occurrence of a defect.

The learning unit 70 determines that the learning start condition is satisfied (S11). The learning start condition includes, for example:

(i) immediately after the process of the learning unit 70 starts;

(ii) the determination unit 13 performs determination for a predetermined number of times;

(iii) a predetermined period has passed since the last time when the learning start condition is satisfied; and (iv) receiving a learning start instruction from the outside.

In the case where any of these conditions is satisfied, the learning unit 70 determines that the learning start condition is satisfied. However, the learning start condition is not limited to the above. In addition, it may suffice if one or more of these conditions do not serve as the learning start condition.

In the case where the learning start condition is not satisfied ("NO" in S11), the learning unit 70 repeats Step S11 until the learning start condition is satisfied. In the case where the learning start condition is satisfied ("YES" in S11), the learning unit 70 acquires the learning data (S12). In the case immediately after the process of the learning unit 70 starts, the learning data is teacher data stored in the storage device. In other cases, the learning data is the learning data stored into the storage device from the determination unit 13 in Step S5. Then, the learning unit 70 determines, through learning, the predetermined number in the PLC 10 based on the learning data, and outputs the predetermined number to the determination unit 13 (S13). Then, the determination unit 13 determines, through learning, the predetermined position and the second threshold in the PLC 10 based on the learning data, and outputs the predetermined position and the second threshold to the determination unit 13 (S14). Then, the learning unit 70 ends the learning process.

In the case where the determination unit 13 makes a determination by using the third threshold as the reference in S3, the determination unit 13 may also determine, through learning, the predetermined range and the third threshold in the PLC 10 based on the learning data in S14, and output the predetermined range and the third threshold to the determination unit 13.

[Example of Implementation by Software]

The control block (in particular, the determination unit 13) of the PLC 10 and the learning unit 70 may be realized by logic circuits (hardware) formed in integrated circuits (IC chips), and may also be realized as software.

In the latter case, the PLC 10 includes a computer for executing commands of a program that is the software for realizing the respective functions. The computer, for example, includes one or more processors, and includes a computer-readable recording medium storing the program. Moreover, in the computer, the processor reads the program from the recording medium and executing the program. Accordingly, the objective of the invention is achieved. A central processing unit (CPU), for example, can be used as the processor. As the recording medium, a "non-transitory tangible medium", such as a read only memory (ROM), a tape, a disc, a card, a semiconductor memory, a programmable logic circuit can be used. In addition, a random access memory (RAM) for expanding the program may be further provided. In addition, the program may also be supplied to the computer via any transmission medium (a communication network, broadcasting waves, etc.) able to transmit the program. In an aspect of the invention, the program may also be realized in the form of data signals embodied through electronic transmission and embedded in carrier waves.

[Summary]

In order to solve the above issue, an aspect of the invention provides a screw tightening defect determination device which, among data points sampling, at a predetermined cycle, a rotary torque of a motor that generates a rotary movement of a driver for tightening a screw and around an axis, generates a normalized torque data sequence that is an amount of change with respect to the rotary torque at an initial data point of a data sequence for the data sequence, the data sequence being a data sequence of the rotary torque formed by data points of a predetermined number and ending with a data point at which the rotary torque is equal to or greater than a predetermined first threshold, and determines whether a defect occurs in screw tightening based on the normalized torque data sequence.

According to the above configuration, the normalized torque data sequence is compared with, for example, a torque data sequence at the time of abnormality, and whether a defect occurs in screw tightening can be determined. Therefore, in the case where a tapping screw is used in a soft material, for example, even if the torque value changes for each workpiece, whether a defect occurs in screw tightening can be determined.

In addition, in the screw tightening defect determination device according to an aspect of the invention, it may also be that, in a case where a normalized torque in a data point of a predetermined position, among the normalized torque data sequence, is equal to or greater than a predetermined second threshold, the determination unit determines that a defect occurs in the screw tightening.

According to the configuration, the occurrence of a screw tightening defect can be determined by determining that the normalized torque at the data point of the predetermined position, among the normalized torque data sequence, is equal to or greater than the second threshold.

In addition, an aspect of the invention provides a learning device determining, through learning, one or more of the predetermined number, the predetermined position, and the predetermined second threshold in the screw tightening defect determination device based on learning data including the normalized torque data sequence and a result of determination of being normal or defective for the normalized torque data sequence, and outputting the predetermined number, the predetermined position, or the predetermined second threshold that is determined to the screw tightening defect determination device.

According to the configuration, based on the predetermined number, the predetermined position, or the second threshold that is determined through learning, the occurrence of a screw tightening defect can be properly determined.

Regarding the learning device according to an aspect of the invention, it may also be that, in a case where there is a predetermined number of times of determination by the determination unit, a predetermined lapsed period, or an instruction from outside, the learning device updates, through learning, one or more of the predetermined number, the predetermined position, and the predetermined second threshold based on the normalized torque data sequence in the screw tightening and the result of determination made by the determination unit.

According to the configuration, based on the predetermined number, the predetermined position, or the second threshold that is updated, the occurrence of a screw tightening defect can be properly determined.

In addition, in the screw tightening defect determination device according to an aspect of the invention, it may also be that, in a case where a total of normalized torques in data points of a predetermined range, among the normalized torque data sequence, is equal to or greater than a predetermined third threshold, the determination unit determines that a defect occurs in the screw tightening.

According to the configuration, the occurrence of a screw tightening defect can be determined by determining that the total of the normalized torques at the data points of the predetermined range, among the normalized torque data sequence, is equal to or greater than the third threshold.

In addition, an aspect of the invention provides a learning device determining, through learning, one or more of the predetermined number, the predetermined range, and the predetermined third threshold in the screw tightening defect determination device based on learning data including the normalized torque data sequence and a result of determination of being normal or defective for the normalized torque data sequence, and outputting the predetermined number, the predetermined range, or the predetermined third threshold that is determined to the screw tightening defect determination device.

According to the configuration, based on the predetermined number, the predetermined range, or the third threshold that is determined through learning, the occurrence of a screw tightening defect can be properly determined.

Regarding the learning device according to an aspect of the invention, it may also be that, in a case where there is a predetermined number of times of determination by the determination unit, a predetermined lapsed period, or an instruction from outside, the learning device updates, through learning, one or more of the predetermined number, the predetermined range, and the predetermined third threshold based on the normalized torque data sequence in the screw tightening and the result of determination made by the determination unit.

According to the configuration, based on the predetermined number, the predetermined range, or the third threshold that is updated, the occurrence of a screw tightening defect can be properly determined.

The invention is not limited to the above-described embodiments, and various modifications are possible within the scope indicated in the claims. Embodiments obtained by appropriately combining technical means disclosed in different embodiments are also included in the technical scope of the invention.

REFERENCE SIGN LIST

What is claimed is:

1. A screw tightening defect determination device, comprising: a determination unit which, among data points sampling, at a predetermined cycle, a rotary torque of a motor that generates a rotary movement of a driver for tightening a screw and around an axis, generates a normalized torque data sequence that is an amount of change with respect to the rotary torque at an initial data point of a data sequence for the data sequence, the data sequence being a data sequence of the rotary torque formed by data points of a predetermined number and ending with a data point at which the rotary torque is equal to or greater than a predetermined first threshold, and the determination unit determines whether a defect occurs in screw tightening based on the normalized torque data sequence.

2. The screw tightening defect determination device as claimed in claim 1, wherein in a case where a normalized torque in a data point of a predetermined position, among the normalized torque data sequence, is equal to or greater than a predetermined second threshold, the determination unit determines that a defect occurs in the screw tightening.

3. A learning device, determining, through learning, one or more of the predetermined number, the predetermined position, and the predetermined second threshold in the screw tightening defect determination device as claimed in claim 2 based on learning data comprising the normalized torque data sequence and a result of determination of being normal or defective for the normalized torque data sequence; and outputting the predetermined number, the predetermined position, or the predetermined second threshold that is determined to the screw tightening defect determination device.

4. The learning device as claimed in claim 3, wherein in a case where there is a predetermined number of times of determination by the determination unit, a predetermined lapsed period, or an instruction from outside, the learning device updates, through learning, one or more of the predetermined number, the predetermined position, and the predetermined second threshold based on the normalized torque data sequence in the screw tightening and the result of determination made by the determination unit.

5. The screw tightening defect determination device as claimed in claim 1, wherein in a case where a total of normalized torques in data points of a predetermined range, among the normalized torque data sequence, is equal to or greater than a predetermined third threshold, the determination unit determines that a defect occurs in the screw tightening.

6. A learning device, determining, through learning, one or more of the predetermined number, the predetermined range, and the predetermined third threshold in the screw tightening defect determination device as claimed in claim 5 based on learning data comprising the normalized torque data sequence and a result of determination of being normal or defective for the normalized torque data sequence; and outputting the predetermined number, the predetermined range, or the predetermined third threshold that is determined to the screw tightening defect determination device.

7. The learning device as claimed in claim 6, wherein in a case where there is a predetermined number of times of determination by the determination unit, a predetermined lapsed period, or an instruction from outside, the learning device updates, through learning, one or more of the predetermined number, the predetermined range, and the predetermined third threshold based on the normalized torque data sequence in the screw tightening and the result of determination made by the determination unit.

* * * * *